(12) United States Patent
Biskeborn et al.

(10) Patent No.: US 9,837,103 B1
(45) Date of Patent: Dec. 5, 2017

(54) POLYCRYSTALLINE DIELECTRIC COATING FOR COBALT IRON ALLOY THIN FILMS

(71) Applicant: International Business Machines Corporation, Armonk, NY (US)

(72) Inventors: Robert G. Biskeborn, Hollister, CA (US); Calvin S. Lo, Saratoga, CA (US); Teya Topuria, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/156,035

(22) Filed: May 16, 2016

(51) Int. Cl.
*G11B 5/187* (2006.01)
*G11B 5/21* (2006.01)
*G11B 5/008* (2006.01)

(52) U.S. Cl.
CPC ............ *G11B 5/21* (2013.01); *G11B 5/00813* (2013.01); *G11B 5/1871* (2013.01)

(58) Field of Classification Search
CPC .... G11B 5/3106; G11B 5/3116; G11B 5/1872
See application file for complete search history.

(56) References Cited

U.S. PATENT DOCUMENTS

| | | | | |
|---|---|---|---|---|
| 5,572,391 A * | 11/1996 | Ishiwata | ................. | G11B 5/127 360/119.09 |
| 6,031,694 A * | 2/2000 | Tamura | ................... | C01B 33/20 360/122 |
| 6,188,543 B1 * | 2/2001 | Terunuma | ............ | G11B 5/3109 360/125.33 |
| 8,526,137 B2 * | 9/2013 | Biskeborn | .............. | G11B 5/127 360/110 |
| 8,611,043 B2 * | 12/2013 | Biskeborn | .......... | G11B 5/00821 360/110 |
| 8,780,496 B2 * | 7/2014 | Biskeborn | .......... | G11B 5/00826 360/122 |

(Continued)

FOREIGN PATENT DOCUMENTS

EP 1426781 A2 6/2004

OTHER PUBLICATIONS

Du et al., "Polycrystalline CPP-GMR devices using <001> textured Co2Fe(Ga0.5Ge0.5) Heusler alloy layer and conductive Mg0.5Ti0.5Ox buffer layer," National Institute for Materials Science, Intermag 2015, May 11-15, 2015, 1 page.

*Primary Examiner* — Brian Miller
(74) *Attorney, Agent, or Firm* — Zilka-Kotab, P.C.

(57) ABSTRACT

In one general embodiment, an apparatus includes a magnetic transducer having a CoFe layer and an at least partially polycrystalline alumina-containing coating on a media facing side of the CoFe layer. A graded layer comprising Co, Fe, Al and oxygen is positioned between the alumina-containing coating and the CoFe layer, wherein a ratio of Co to Al in the graded layer decreases from the CoFe layer toward the alumina-containing coating. In another general embodiment, an apparatus includes a magnetic transducer having a CoFe layer and an at least partially polycrystalline alumina-containing coating on a media facing side of the CoFe layer. CoFe-oxide crystallites are present at an interface region of the CoFe layer and the alumina-containing coating and the CoFe layer. Fabrication methods are also presented.

20 Claims, 13 Drawing Sheets

(56) References Cited

U.S. PATENT DOCUMENTS

| | | | |
|---|---|---|---|
| 8,824,100 B2 | 9/2014 | Karr et al. | |
| 8,837,082 B2* | 9/2014 | Biskeborn | G11B 5/00826 |
| | | | 360/121 |
| 9,303,307 B2* | 4/2016 | Biskeborn | C23C 14/081 |
| 2004/0105937 A1 | 6/2004 | Kula et al. | |
| 2006/0078683 A1* | 4/2006 | Mukai | G11B 5/66 |
| | | | 427/402 |
| 2006/0256485 A1 | 11/2006 | Seigler et al. | |
| 2007/0097560 A1* | 5/2007 | Karr | B82Y 10/00 |
| | | | 360/324.2 |
| 2008/0266711 A1* | 10/2008 | Nibarger | G11B 5/00821 |
| | | | 360/130.21 |
| 2009/0027812 A1 | 1/2009 | Noguchi et al. | |
| 2009/0040661 A1 | 2/2009 | Tanaka et al. | |
| 2010/0053817 A1* | 3/2010 | Biskeborn | B82Y 10/00 |
| | | | 360/313 |
| 2010/0079908 A1* | 4/2010 | Heidmann | G11B 5/455 |
| | | | 360/110 |
| 2012/0170170 A1 | 7/2012 | Gros-Jean | |
| 2012/0307396 A1 | 12/2012 | Biskeborn et al. | |
| 2014/0168816 A1 | 6/2014 | Gubbins et al. | |
| 2015/0063086 A1 | 3/2015 | Wierman | |

\* cited by examiner

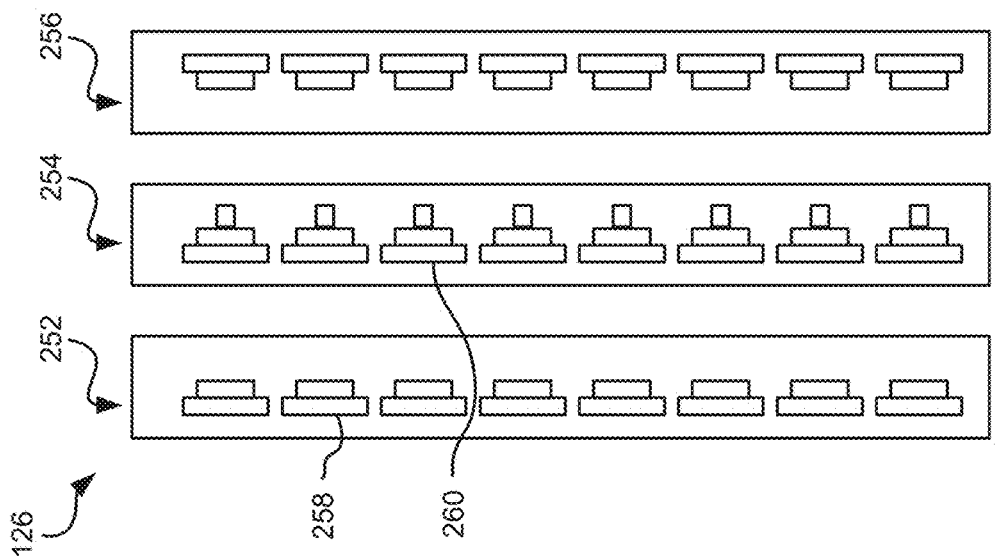
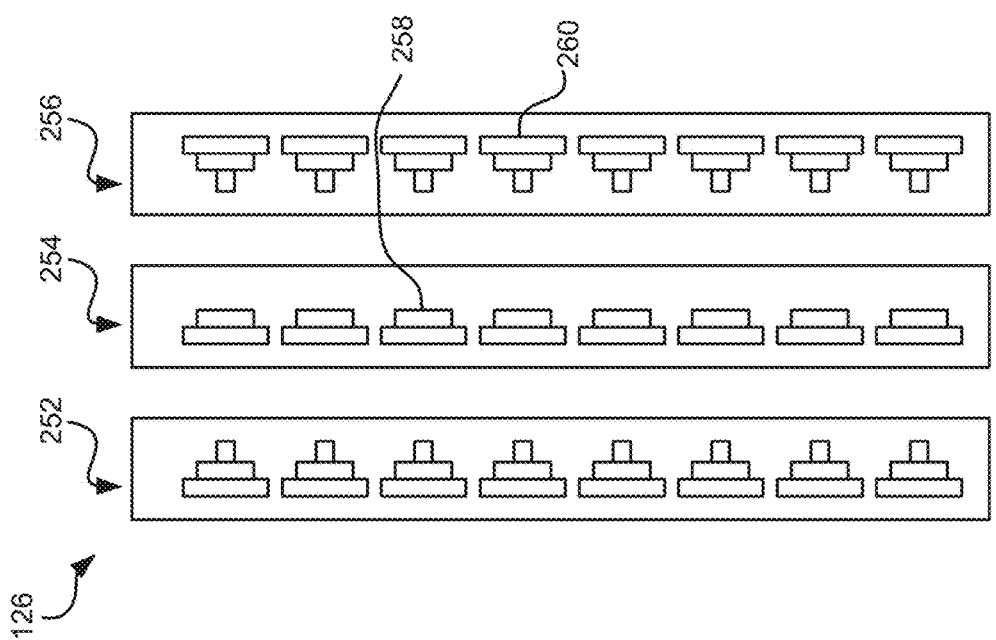

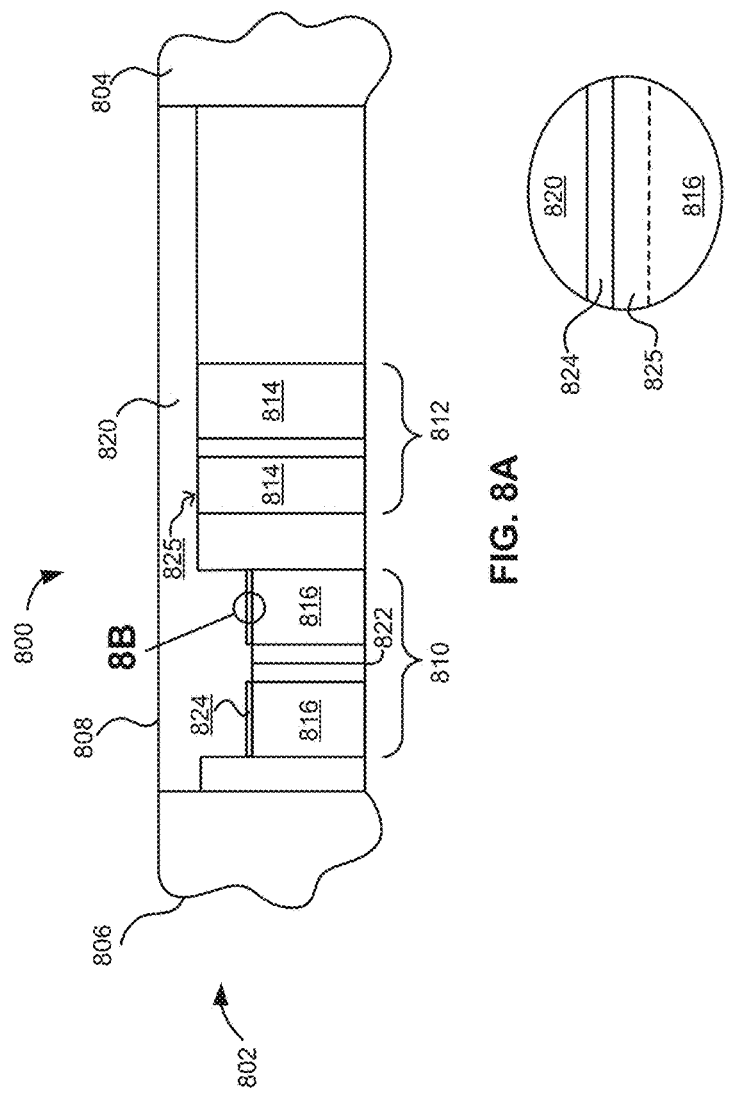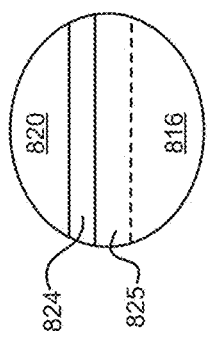

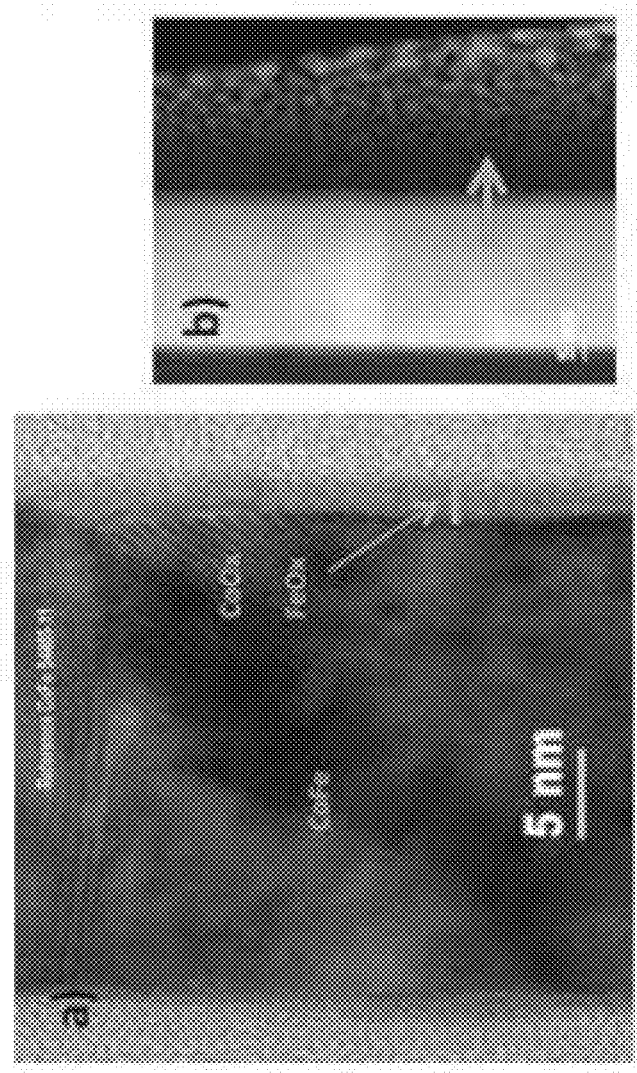
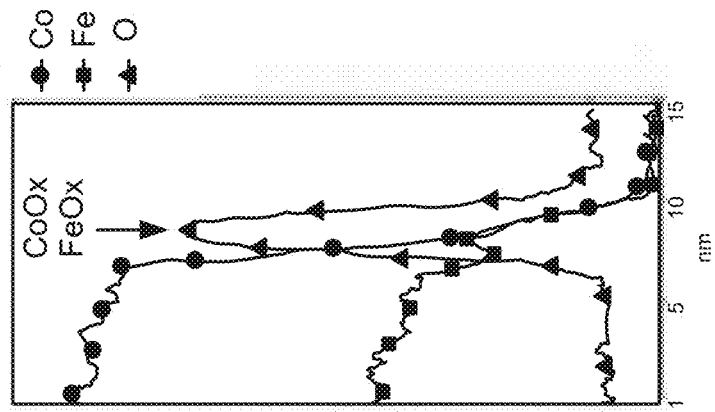
FIG. 10A
FIG. 10B
FIG. 10C

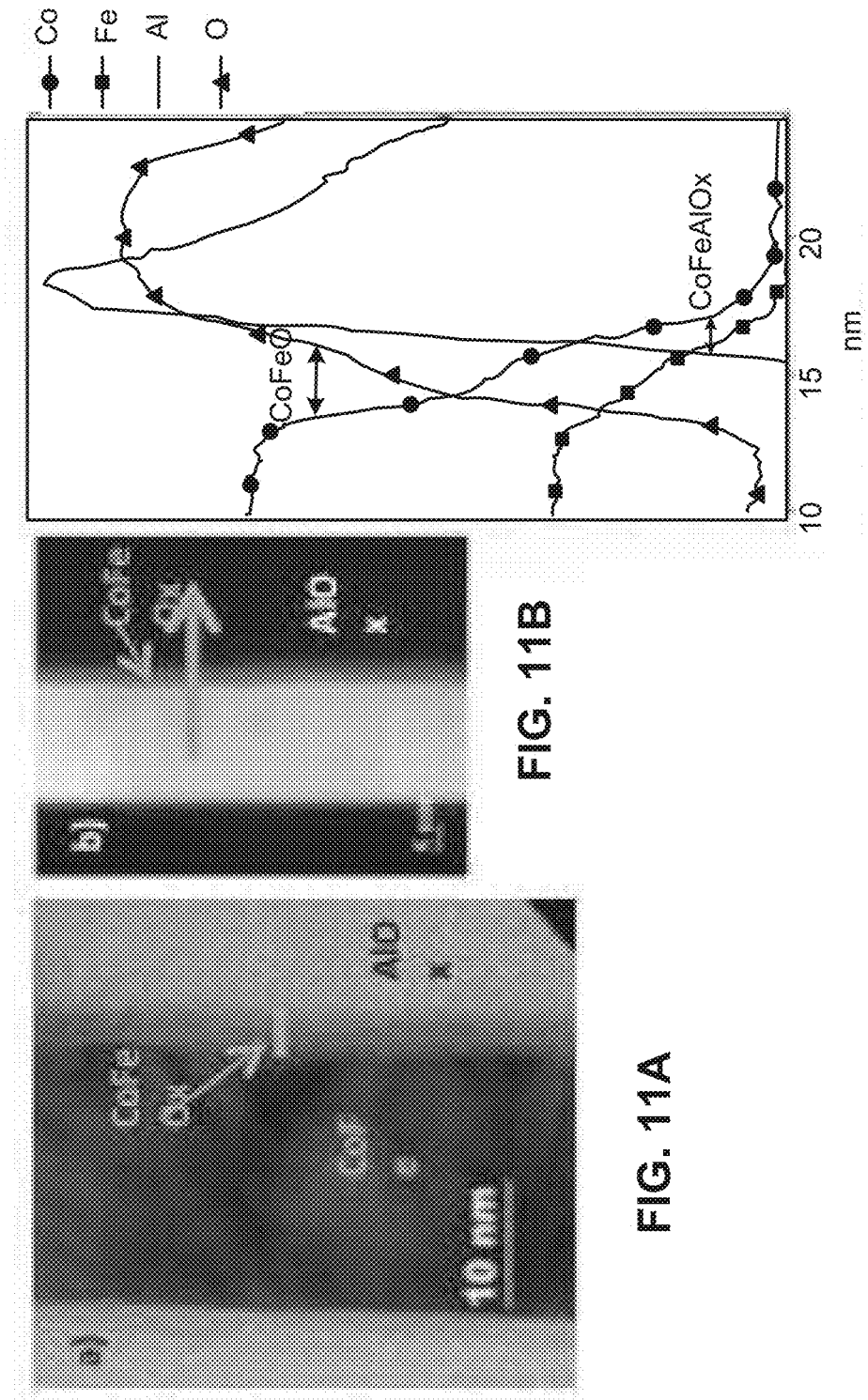

US 9,837,103 B1

POLYCRYSTALLINE DIELECTRIC COATING FOR COBALT IRON ALLOY THIN FILMS

BACKGROUND

The present invention relates to data storage systems, and more particularly, this invention relates to polycrystalline dielectric coating for cobalt iron alloy thin films useable with magnetic heads.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a magnetic transducer having a CoFe layer and an at least partially polycrystalline alumina-containing coating on a media facing side of the CoFe layer. A graded layer comprising Co, Fe, Al and oxygen is positioned between the alumina-containing coating and the CoFe layer, wherein a ratio of Co to Al in the graded layer decreases from the CoFe layer toward the alumina-containing coating.

An apparatus according to another embodiment includes a magnetic transducer having a CoFe layer and an at least partially polycrystalline alumina-containing coating on a media facing side of the CoFe layer. CoFe-oxide crystallites are present at an interface region of the CoFe layer and the alumina-containing coating and the CoFe layer.

A method according to yet another embodiment includes performing a reducing operation for reducing a native oxide along a surface of a CoFe layer of a magnetic transducer. After performing the reducing operation, an oxidation operation for oxidizing the surface of the CoFe layer is performed. After performing the oxidation operation, a layer of at least partially crystalline alumina is formed on the oxidized surface of the CoFe layer.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 8A is a partial cross sectional view of a magnetic head according to one embodiment.

FIG. 8B is a detailed view taken from Circle 8B of FIG. 8A.

FIG. 10A is a magnified view of amorphous Co oxide and Fe oxide at a CoFe surface of a comparative example.

FIG. 10B is a magnified view of a portion of FIG. 10A.

FIG. 10C is an electron energy loss spectroscopy (EELS) scan across the layer interface shown in FIGS. 10A and 10B.

FIG. 11A is a magnified view of a comparative example.

FIG. 11B is a magnified view of a portion of FIG. 11A.

FIG. 11C is an electron energy loss spectroscopy (EELS) scan across the layer interface shown in FIGS. 11A and 11B.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a magnetic transducer having a CoFe layer and an at least partially polycrystalline alumina-containing coating on a media facing side of the CoFe layer. A graded layer comprising Co, Fe, Al and oxygen is positioned between the alumina-containing coating and the CoFe layer, wherein a ratio of Co to Al in the graded layer decreases from the CoFe layer toward the alumina-containing coating.

In another general embodiment, an apparatus includes a magnetic transducer having a CoFe layer and an at least partially polycrystalline alumina-containing coating on a media facing side of the CoFe layer. CoFe-oxide crystallites are present at an interface region of the CoFe layer and the alumina-containing coating and the CoFe layer.

In yet another general embodiment, a method includes performing a reducing operation for reducing a native oxide along a surface of a CoFe layer of a magnetic transducer. After performing the reducing operation, an oxidation operation for oxidizing the surface of the CoFe layer is performed. After performing the oxidation operation, a layer of at least partially crystalline alumina is formed on the oxidized surface of the CoFe layer.

Figure 1A:
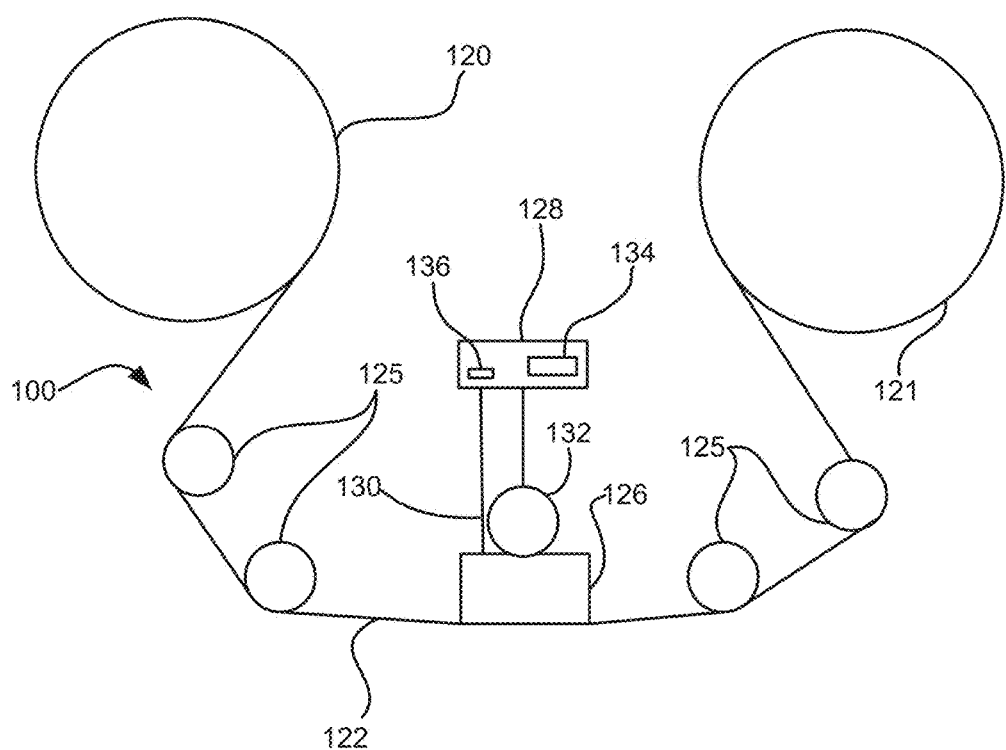
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
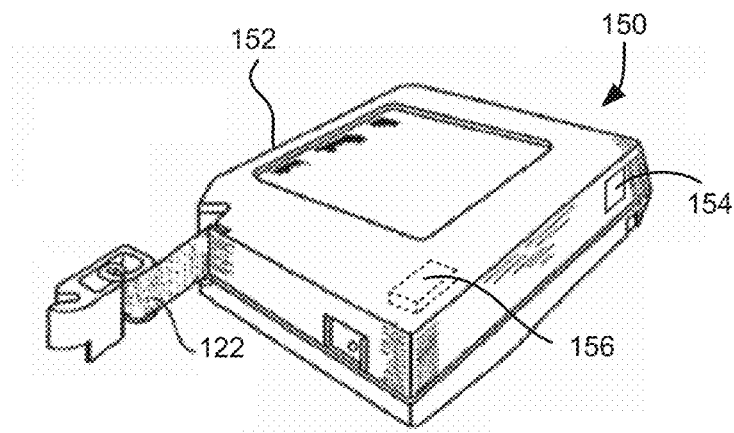
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
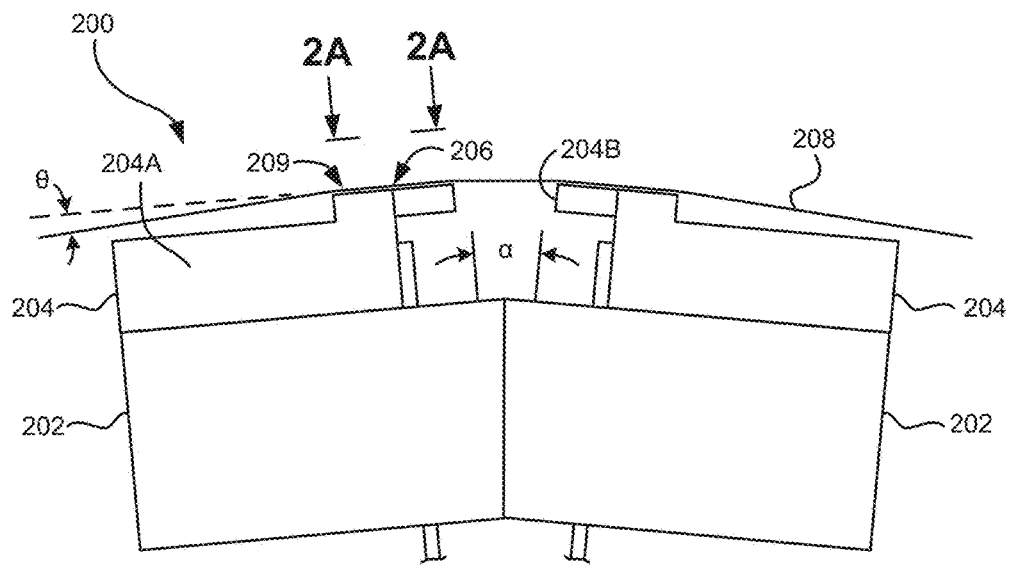
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
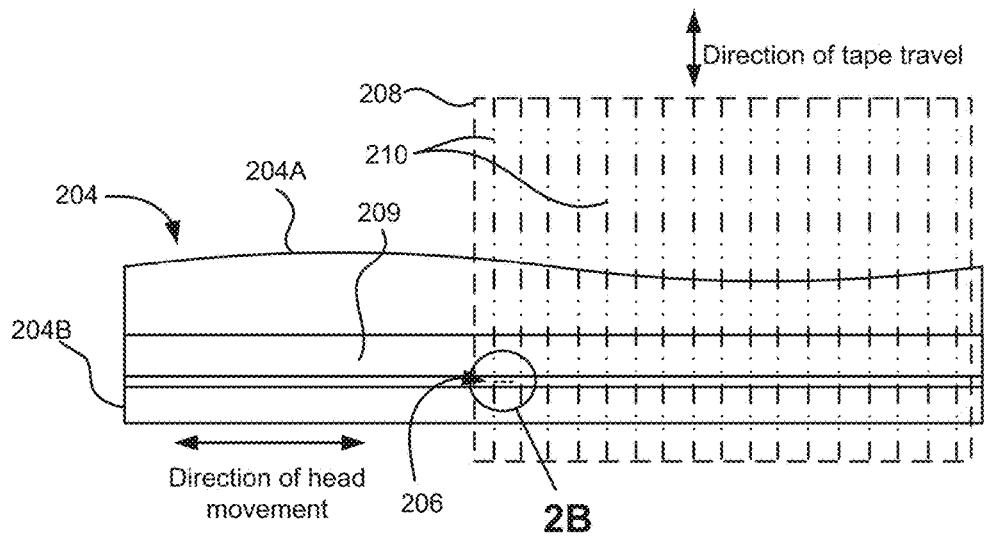
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
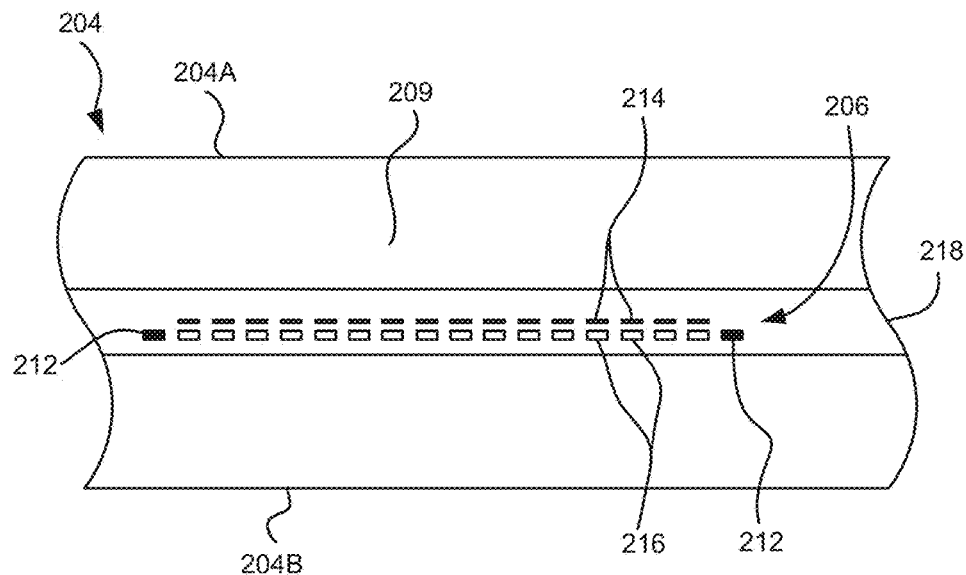
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
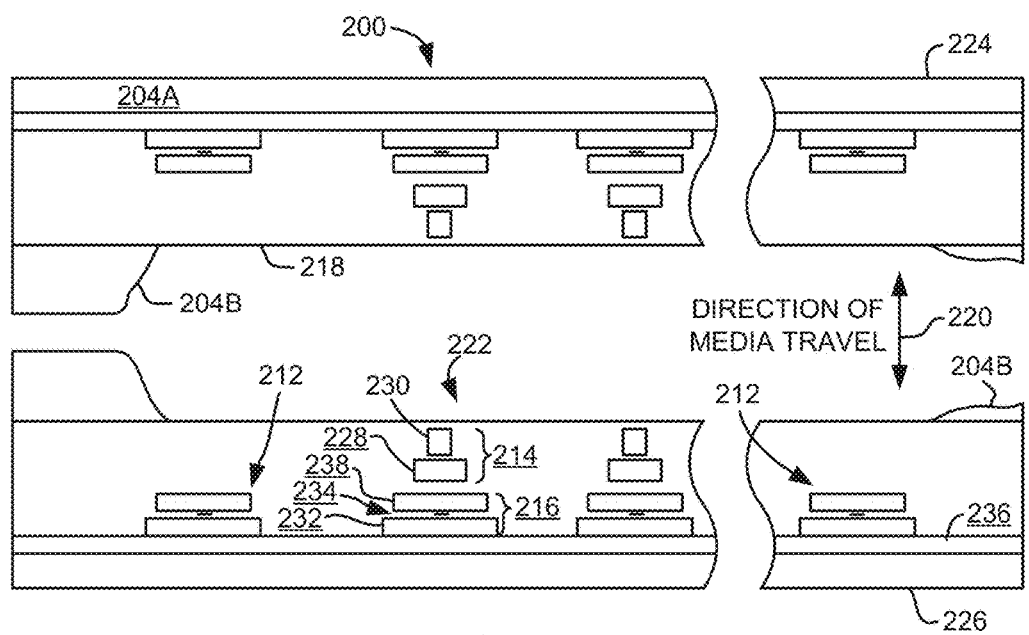
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
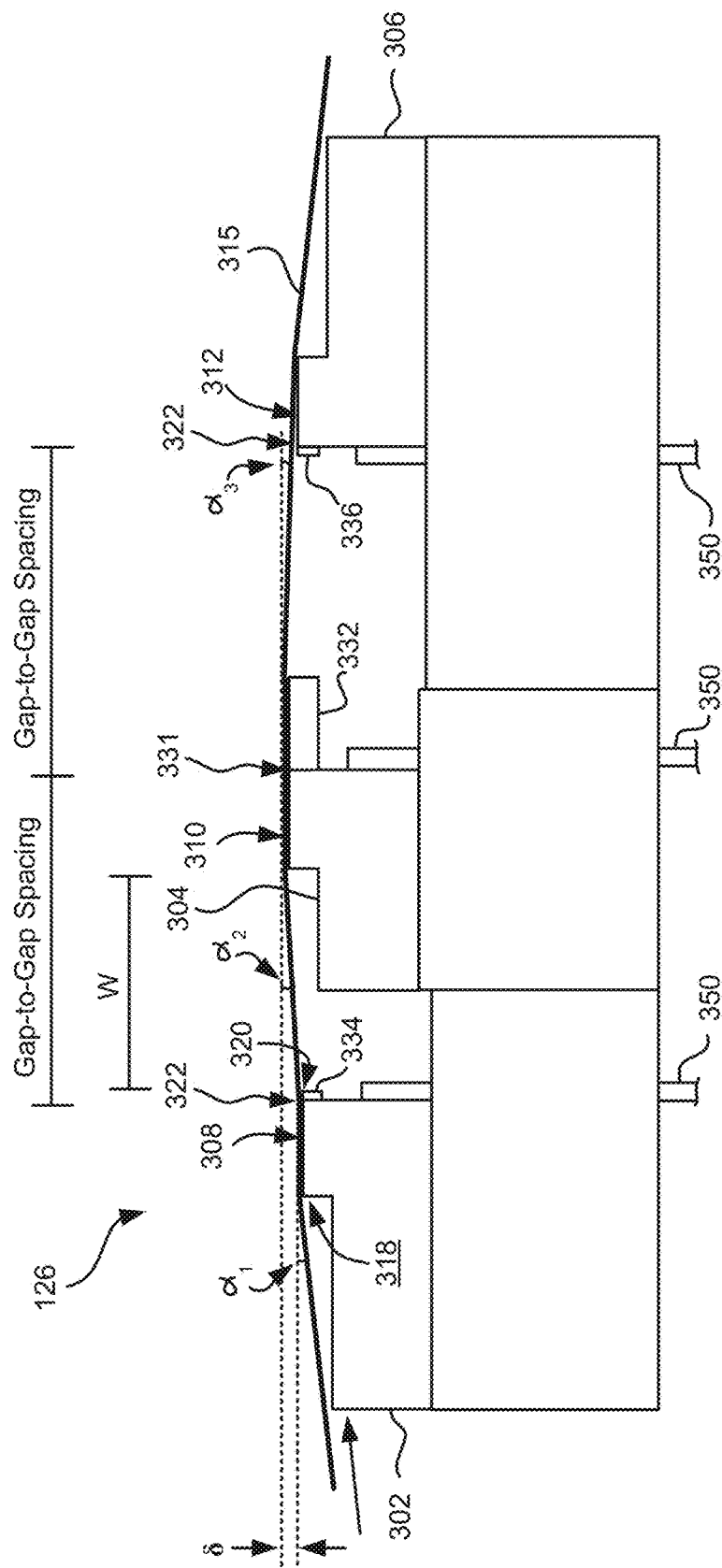
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
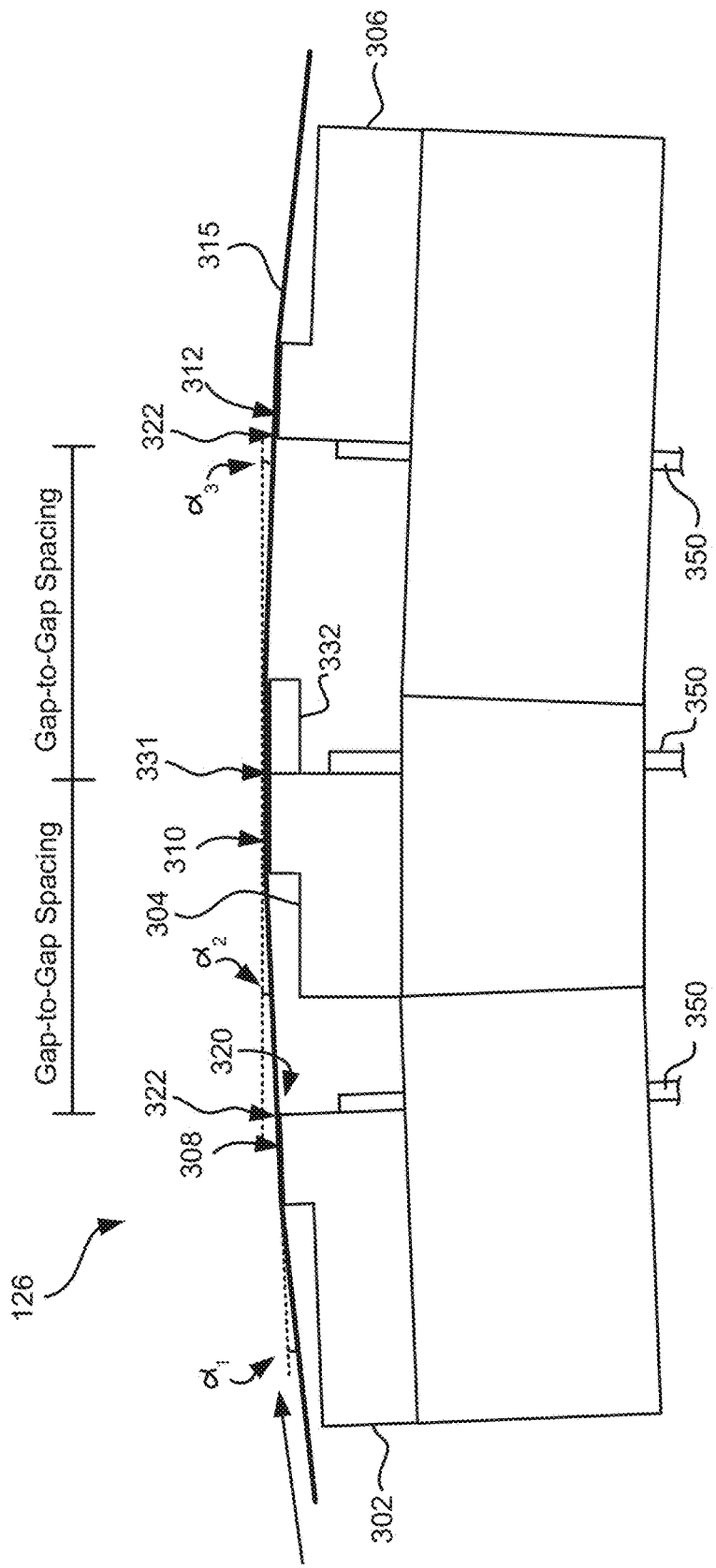
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304.

The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
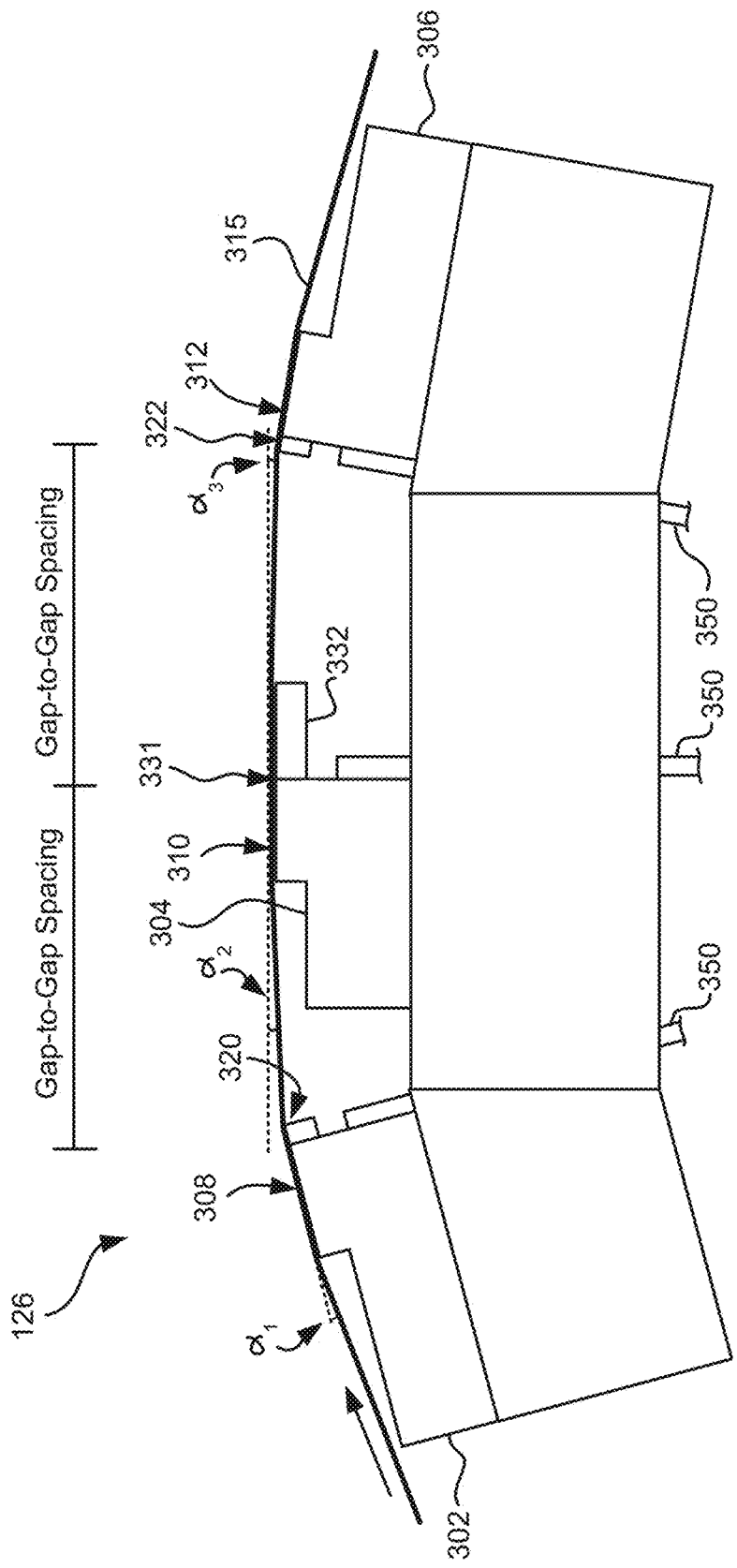
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

In magnetic head structures, it may be desirable to incorporate sensor protection for a reader and/or writer transducers to provide high wear resistance and adhesion. Moreover, durable cobalt-iron-based (CoFe-based) layers that are part of the pinned and/or free layers in the magnetic tunnel junctions (MTJ) may improve performance of the tape head. CoFe-based layers without protection may not be durable and may corrode when exposed to running magnetic media. Corrosion may adversely affect head-medium spacing and head stability, and may degrade head writing and reading performance. In preferred embodiments, protection may be provided by coating the CoFe-based layers of the reader and/or writer transducers with a durable material.

A preferred coating technology for tape heads with alloys of nickel and iron may be polycrystalline aluminum oxide, according to various embodiments. CoFe-based layers of the TMR tape heads may benefit from additional processing for durable coating adhesion. In preferred embodiments, an improved CoFe-Aluminum (Al) oxide interface may provide a durable at least partial polycrystalline coating on the CoFe layer.

FIG. 8A depicts a magnetic head 800 in accordance with various illustrative embodiments. As an option, the present magnetic head 800 may be implemented in conjunction with features from any other embodiment listed herein, such as those described with reference to the other FIGS. Of course, however, such magnetic head 800 and others presented herein may be used in various applications and/or in permutations, which may or may not be specifically described in the illustrative embodiments listed herein. Further, the magnetic head 800 presented herein may be used in any desired environment.

As shown in FIG. 8A according to one approach, the magnetic head 800 may include a module 802. In one embodiment, the magnetic head 800 may include a second and/or third module having a configuration similar or identical to the module 802. For example, the magnetic head 800 may be similar to any of the magnetic heads described herein.

In another embodiment, the magnetic head 800 may be configured to operate with tape media. In yet another embodiment, the magnetic head 800 may include a slider that may be used, e.g. with a magnetic disk.

Additionally, the magnetic head 800 may include one or more read transducers 810 and one or more write transducers 812, as well as conventional layers such as insulating layers, leads, coils, etc. as would be apparent to one skilled in the art upon reading the present description. In one approach, the one or more read transducers 810 and the one or more write transducers 812 may be positioned towards the media facing side 808 of the module 802. In another approach, the one or more read transducers 810 and the one or more write transducers 812 may be sandwiched in a gap portion between the closure 804 and the substrate 806. In yet another approach, the one or more read transducers 810 and the one or more write transducers 812 may be present in an array of transducers extending along the media facing side 808 of the module 802.

The one or more read transducers 810 and the one or more write transducers 812 may be selected from the group consisting of piggyback read-write transducers, merged read-write transducers, and interleaved read and write transducers, according to various embodiments. For example, in one approach the one or more read transducers 810 and the one or more write transducers 812 may be piggyback read-write transducers, such as those depicted in FIG. 2C.

In another approach, as depicted in FIG. 8A, the one or more read transducers 810 and the one or more write transducers 812 may be merged read-write transducers, where an upper sensor shield acts as a pole of the writer as well as a sensor shield.

In yet another approach, as depicted in FIG. 8A, the one or more read transducers 810 and the one or more write transducers 812 may be interleaved read and write transducers, where the read and write transducers alternate along the array.

According to another embodiment, the one or more write transducers 812 may be flanked by servo read transducers, e.g. as in FIG. 2B.

With continued reference to FIG. 8A, the one or more write transducers 812 may include write poles 814 having media facing sides that may be recessed a depth di from a plane 824 extending along the media facing side 808 of the module 802, according to one embodiment.

As shown in FIG. 8A, according to yet another embodiment, one or more write transducers 812 may include write poles 814 that may be be comprised of CoFe-based layers. In other embodiments, the pinned layer and/or free layer in the TMR and GMR of at least one sensor 822 of one or more read transducers 810 may be comprised of CoFe-based layers. In some approaches the AFM stabilized magnetic shield 816 may be comprised of CoFe-based layers.

In continued reference to FIG. 8A, according to one embodiment, a magnetic transducer 810 and/or 812 may have a CoFe layer and an at least partially polycrystalline alumina-containing coating 820 on a media facing side of the CoFe layer, in which a graded layer 824 comprising Co, Fe, Al and oxygen (O) may be positioned between the alumina-containing coating 820 and the CoFe layer. In other embodiments, a magnetic transducer 810 and/or 812 may have a CoFe layer and an at least partially polycrystalline alumina-containing coating 820 on a media facing side of the CoFe layer, such that CoFe-oxide crystallites may be present at the interface region 825 of the CoFe layer and the alumina-containing coating 820 and the CoFe layer.

In various embodiments, an interface region 825 of the CoFe layers and/or graded layer 824 above the CoFe layers may be present at the reader transducer(s) 810 and/or the writer transducer(s) 812. In some approaches, a graded layer 824 may be present above each of the CoFe layers in the module 802. In other approaches, an interface region 825 is present in one or more of the CoFe layers. As shown in the exemplary embodiment of FIG. 8A, a graded layer 824 is present above the shields 816 while interface regions 825 are present in the write poles 814. In yet another approach, an interface region 825 may be present along the surface of the CoFe layer and a graded layer 824 is present above the interface region 825 as shown in FIG. 8B.

In some approaches, the ratio of Co to Al in the graded layer 824 may decrease from the CoFe layer toward the alumina-containing coating 820. In other embodiments, the alumina-containing coating 820 may be comprised primarily of alumina, where the alumina-containing coating also includes cobalt oxide and iron oxide. Particularly, the alumina based coating 820 has more alumina than any other component, as well as some cobalt oxide and iron oxide. In yet other approaches, the graded layer 824 comprising Co, Fe, Al and O may form an interface between the CoFe layer and the alumina-containing coating. In other embodiments, the graded layer 824 comprising Co, Fe, Al, and oxygen may be partially crystalline.

In a preferred embodiment, the alumina-containing coating 820 may be formed on an entire media facing side 808 of the magnetic transducer 810, 812, e.g., the media facing side of reader and/or writer portion of the head, but not necessarily the media facing side of the entire head 800. Moreover, in some approaches the write transducer 812 may be comprised of at least a Co, Fe, and Ni alloy portion. In other embodiments, the read transducer shield 816 may be comprised of at least a Co, Fe, and Ni alloy portion.

In some approaches, the thickness of the graded layer 824 comprising Co, Fe, Al, and O may be less than 50 nanometers (nm), but greater than zero nm. Preferably, the graded layer 824 is least 3 nm thick.

Figure 9:
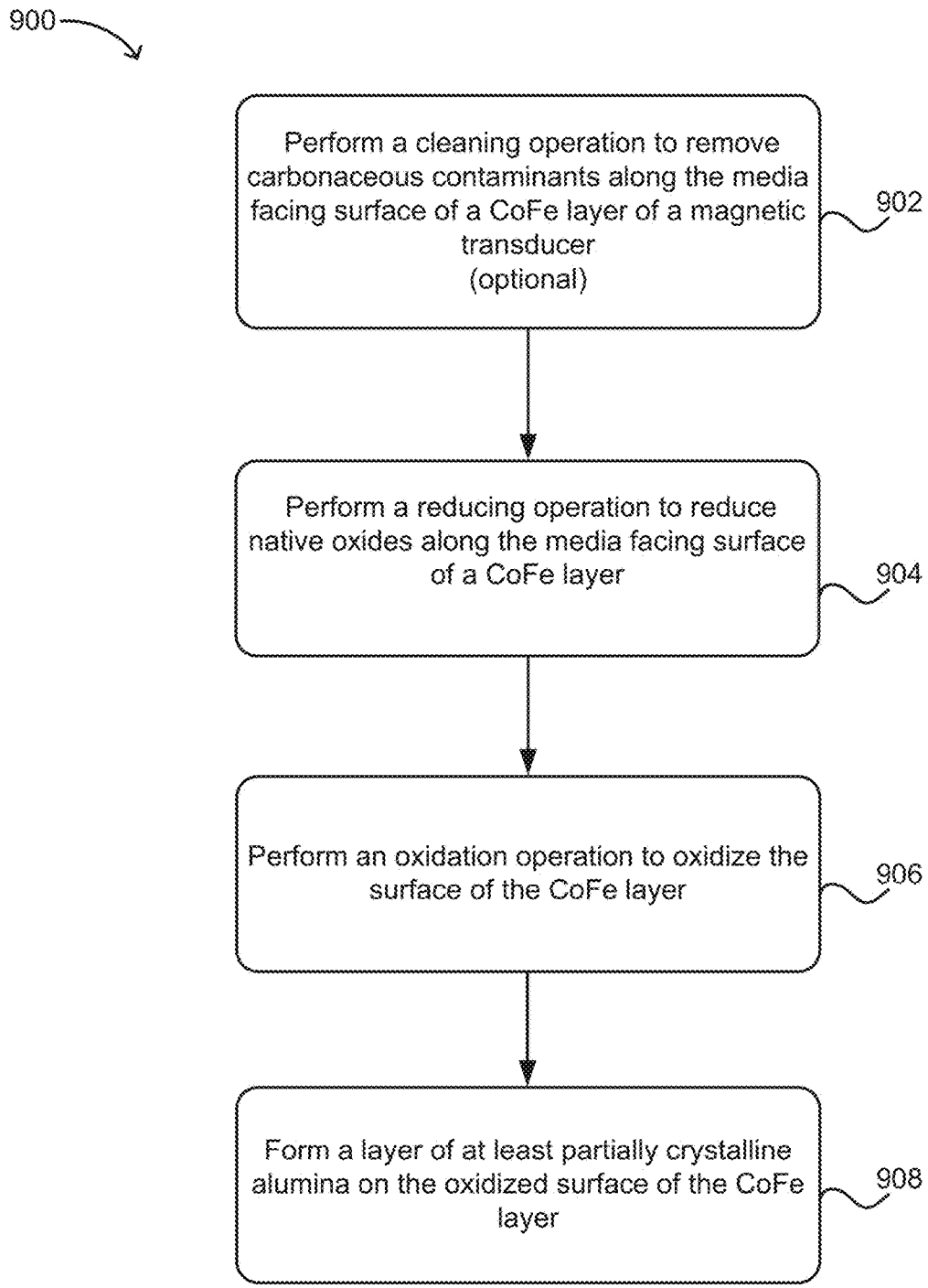
FIG. 9 is a flow diagram of a process according to one embodiment.

Now referring to FIG. 9, a flowchart of a method 900 is shown according to one embodiment. The method 900 may be used to create any of the various embodiments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed using known techniques according to the teachings herein.

Referring to step 902 of FIG. 9, an optional cleaning operation may be performed prior to a reducing operation. Known cleaning techniques may be used. Preferred embodiments implement a cleaning operation that involves ion milling, e.g. sputter cleaning, bombarding with ionized argon, etc. the CoFe-based layer at a low incidence angle of between about 5 and about 20 degrees from normal to the surface of the CoFe layer. The sputtering energy during the milling may be in a range of about 250 to about 500 eV. Moreover, the duration of cleaning may facilitate fragmentation of the carbonaceous contaminants from the surface of the CoFe layer. In general, the cleaning step may take 2 to about 15 minutes.

While the cleaning step 902 removes carbonaceous contaminants, it is also desirable to remove amorphous Co oxides and/or Fe oxides from the CoFe surface upon which the alumina layer will be formed. FIG. 10A is a magnified view of amorphous Co oxide and Fe oxide at a CoFe surface of a comparative example. The composition of the amorphous Co oxide (CoOx) and Fe oxide (FeOx) is shown in the direction of the arrow of FIG. 10B, which is a Z-contrast image of the structure in FIG. 10A with the spectral scan direction being indicated by the arrow. FIG. 10C is an electron energy loss spectroscopy (EELS) scan across the layer interface shown in FIGS. 10A and 10B. The EELS scan shows the presence of the amorphous CoOx and FeOx before the reducing operation 904, described below.

Referring to step 904 of FIG. 9, following the cleaning operation if it was performed, a reducing operation is performed. Known reducing procedures may be used. Preferred embodiments involving ion milling, e.g. sputter cleaning, bombarding with ionized argon, etc. at a high incidence angle of between about 50 and about 70 degrees from normal to the surface of the CoFe-based layer for at least one of removing any remaining carbonaceous contaminants and reducing the native oxides on the surface of the CoFe layer. Moreover, the duration of the reducing operation is preferably sufficient to remove substantially all of an amorphous native Co and Fe oxides sublayer from the CoFe layer, e.g., reducing an amorphous $CoFeO_x$ layer where x in this and other layers represents a potential deviation from an approximately stoichiometric ratio. As used herein, "substantially all" of the amorphous native oxide sublayer is at least 95% thereof. In general, the reducing operation may take 5 to about 20 minutes at a sputtering energy during the milling in the range of about 250 to about 500 eV.

Figure 12C:
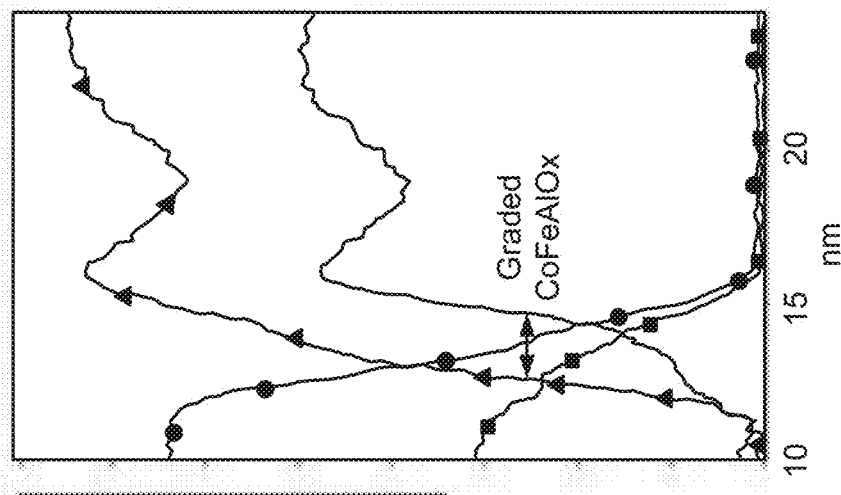
FIG. 12C is an electron energy loss spectroscopy (EELS) scan across the layer interface shown in FIGS. 12A and 12B.
Figure 12B:
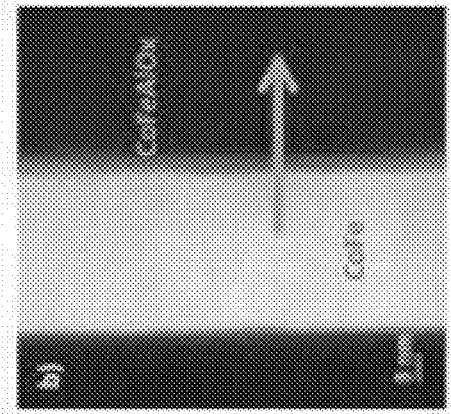
FIG. 12B is a magnified view of a portion of FIG. 12A.
Figure 12A:
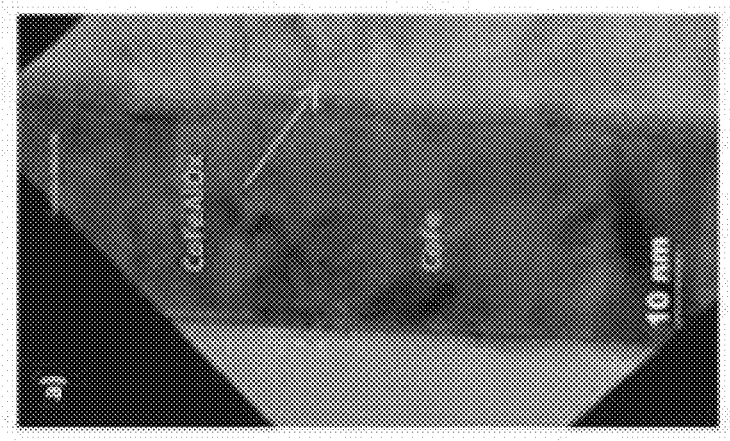
FIG. 12A is a magnified view of an embodiment of the present invention.

Because it is expected that the importance of removing all of the amorphous native oxides would not be readily apparent to one skilled in the art, a comparative example showing the importance of removing all of the amorphous native oxides in step 904 is made with reference to FIGS. 11A-11C, and an embodiment shown in FIGS. 12A-12C. FIG. 11A is a magnified view of a $CoFeAlO_x$ transition layer in which the amorphous native oxides, CoOx and FeOx, have not been completely removed (yellow arrow). The direction of the arrow of FIG. 11B, which is a Z-contrast image of the structure in FIG. 11A with the spectral scan direction being indicated by the arrow. FIG. 11C is an EELS scan across the layer interface shown in FIGS. 11A and 11B. The EELS scan shows the presence of a CoFeAlOx layer, but the interface no longer provides adequate bonding of the alumina coating to the CoFe layer.

Referring to step 906 of FIG. 9, following the reducing operation and prior to forming a layer of at least partially crystalline alumina, an oxidation operation is performed to reoxidize reduced metal oxides. Known oxidation techniques may be used, such as exposure to an oxygen-containing atmosphere, application of a liquid oxidant, etc. According to a preferred approach, the oxidation operation involves applying an oxygen plasma for oxidizing the surface of the CoFe layer, e.g., to reoxidize reduced metal oxides. The sputtering energy during the ion milling may be in a range of about 250 to about 500 eV. Where the layer is CoFe, for example, reoxidation is exothermic and promotes CoFe-oxide recrystallization on the underlying CoFe grains. Newly formed oxide crystallites act as template for subsequent alumina coating crystallization. The cleaning and reducing followed by the oxidizing operations may promote formation of a graded layer between the CoFe layer and the subsequently-formed crystalline alumina layer thereabove. In some embodiments, the oxidation operation may overlap with the reducing operation, e.g., portions of the operations may be performed concurrently and/or the operations may transition from one to the other in a continuous manner.

Referring to Step 908 of FIG. 9, forming the alumina coating involves depositing alumina, e.g., via sputtering, for forming a layer of at least partially crystalline alumina on the oxidized surface of the CoFe layer. The at least partially crystalline alumina on the oxidized surface of the CoFe layer can be formed at a temperature of between about 20 and about 50 degrees centigrade, which is advantageous where the head is sensitive to higher temperatures. Alumina deposition may be performed in the same chamber as ion milling, without breaking the vacuum. Highly energetic aluminum ions from the reactive sputtering of alumina in the oxygen atmosphere may initiate thermite-like reactions with the CoFeOx crystallites and may promote coating crystallization and adhesion with the underlying CoFe layer. Without wishing to be bound by any theory, the inventors believe the thermite-like reaction between the CoFeOx crystallites and the alumina may trigger Co and Fe diffusion upwards toward the alumina coating thereby resulting in formation of a graded layer of Co, Fe, Al, and O. Moreover, the inventors believe the final layer of the at least partially crystalline alumina on the oxidized surface of the CoFe layer may include one or more of the cubic allotropes of alumina. The coating may transition to amorphous state once the Co and Fe concentrations are reduced to less than 1% and at a level undetectable by EELS FIG. 12A is a magnified view of a properly formed, graded, $CoFeAlO_x$ graded layer, with substantially no amorphous CoFeO at the CoFe surface. The composition of the $CoFeAlO_x$ graded layer thus transitions from a higher CoFe content at the left side to a higher alumina content on the right side in the direction of the arrow of FIG. 12B, which is a Z-contrast image of the structure in FIG. 12A with the spectral scan direction being indicated by the arrow. FIG. 12C is an EELS scan across the layer surface shown in FIGS. 12A and 12B. The EELS scan shows the presence of the graded layer.

Figures 13A, 13B:
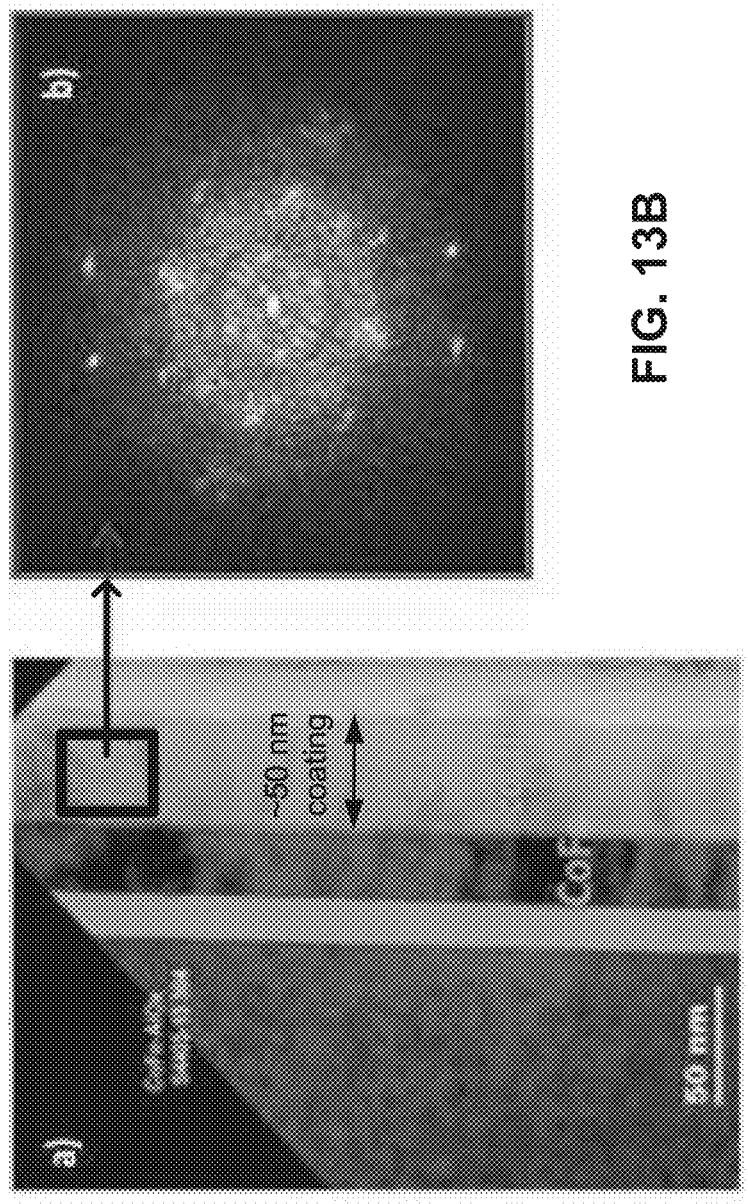
FIG. 13A is a Transmission Electron Microscopy (TEM) image of an embodiment of the present invention.
FIG. 13B is a diffractogram of the structure shown in FIG. 13A.

According to the tested embodiment, the alumina coating on the CoFe layer with a CoFeAlOx graded layer may be at least partially polycrystalline. FIG. 13A is a Transmission Electron Microscopy (TEM) image of the alumina coating on the CoFe layer and the resulting crystallization. It was also discovered that the depth of crystallization of the alumina coating could be as much as 50 nm as shown in FIG. 13A. The alumina layer formed on the CoFeAlOx graded layer, sampled from FIG. 13A, exhibits a high degree of crystallinity as shown in the diffractogramm shown in FIG. 13B, where the bright spots indicate crystallinity.

Furthermore, the tape-based data storage system may include a drive mechanism for passing a magnetic medium over the transducer, and a controller electrically coupled to the transducer of the magnetic head. According to various approaches, the controller may be electrically coupled to the magnetic head via a wire, a cable, wirelessly, etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a magnetic transducer having a CoFe layer and an at least partially polycrystalline alumina-containing coating on a media facing side of the CoFe layer,
   wherein a graded layer comprising Co, Fe, Al and oxygen is positioned between the alumina-containing coating and the CoFe layer, wherein a ratio of Co to Al in the graded layer decreases from the CoFe layer toward the alumina-containing coating.

2. The apparatus as recited in claim 1, wherein the alumina-containing coating is comprised primarily of alumina, wherein the alumina-containing coating also includes cobalt oxide and iron oxide.

3. The apparatus as recited in claim 1, wherein the graded layer forms an interface between the CoFe layer and the alumina-containing coating.

4. The apparatus as recited in claim 1, wherein the graded layer is partially crystalline.

5. The apparatus as recited in claim 1, wherein the alumina-containing coating is formed on an entire area of the media facing side of the magnetic transducer.

6. The apparatus as recited in claim 1, comprising a write transducer comprised of at least a Co, Fe, and Ni alloy portion.

7. The apparatus as recited in claim 1, comprising a read transducer shield comprised of at least a Co, Fe, and Ni alloy portion.

8. The apparatus as recited in claim 1, wherein a thickness of the graded layer is at least 3 nanometers.

9. The apparatus as recited in claim 1, wherein a thickness of the graded layer is less than 50 nanometers and greater than 0 nanometers.

10. The apparatus as recited in claim 1, further comprising:
a drive mechanism for passing a magnetic medium over the transducer; and
a controller electrically coupled to the transducer.

11. An apparatus, comprising:
a magnetic transducer having a CoFe layer and an at least partially polycrystalline alumina-containing coating on a media facing side of the CoFe layer,
wherein CoFe-oxide crystallites are present at an interface region of the CoFe layer and the alumina-containing coating and the CoFe layer.

12. The apparatus as recited in claim 11, wherein a graded layer comprising Co, Fe, Al and oxygen is positioned between the alumina-containing coating and the CoFe layer, wherein a ratio of Co to Al in the graded layer decreases from the CoFe layer toward the alumina-containing coating.

13. The apparatus as recited in claim 12, wherein the graded layer is partially crystalline.

14. The apparatus as recited in claim 12, wherein a thickness of the graded layer is at least 3 nanometers.

15. The apparatus as recited in claim 12, wherein a thickness of the graded layer is less than 50 nanometers and greater than 0 nanometers.

16. The apparatus as recited in claim 11, wherein the alumina-containing coating is comprised primarily of alumina, wherein the alumina-containing coating also includes cobalt oxide and iron oxide.

17. The apparatus as recited in claim 11, wherein the alumina-containing coating is formed on an entire area of the media facing side of the magnetic transducer.

18. The apparatus as recited in claim 11, further comprising:
a drive mechanism for passing a magnetic medium over the transducer; and
a controller electrically coupled to the transducer.

19. A method for fabricating the magnetic transducer of claim 1, the method comprising:
performing a reducing operation for reducing a native oxide along a surface of the CoFe layer of the magnetic transducer;
after performing the reducing operation, performing an oxidation operation for oxidizing the surface of the CoFe layer; and
after performing the oxidation operation, forming the layer of at least partially crystalline alumina-containing coating on the oxidized surface of the CoFe layer.

20. The method as recited in claim 19, wherein the oxidized surface of the CoFe layer has CoFe-oxide crystallites therein.

* * * * *